(12) United States Patent
Minaz et al.

(10) Patent No.: US 12,236,732 B2
(45) Date of Patent: Feb. 25, 2025

(54) INTELLIGENT CHARGE LIMIT FOR HIGH VOLTAGE BATTERIES

(71) Applicant: International Engine Intellectual Property Company, LLC, Lisle, IL (US)

(72) Inventors: Askin Minaz, Aurora, IL (US); Grant Davisson, St. Charles, IL (US); Patrick Yerkes, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 325 days.

(21) Appl. No.: 17/858,742

(22) Filed: Jul. 6, 2022

(65) Prior Publication Data
US 2024/0013591 A1   Jan. 11, 2024

(51) Int. Cl.
*B60L 58/13*   (2019.01)
*B60L 53/62*   (2019.01)
*G07C 5/08*   (2006.01)

(52) U.S. Cl.
CPC ............ *G07C 5/0808* (2013.01); *B60L 53/62* (2019.02); *B60L 2240/12* (2013.01); *B60L 2240/463* (2013.01); *B60L 2240/54* (2013.01); *B60L 2240/642* (2013.01)

(58) Field of Classification Search
CPC . G07C 5/0808; B60L 53/62; B60L 2240/463; B60L 2240/12; B60L 2240/642; B60L 2240/54
See application file for complete search history.

(56) References Cited

U.S. PATENT DOCUMENTS

| | | | |
|---|---|---|---|
| 9,481,359 B2 | 11/2016 | Morisaki | |
| 10,442,313 B2 | 10/2019 | Cholewa et al. | |
| 2016/0167641 A1* | 6/2016 | Yoon | G08G 1/09623 903/903 |
| 2016/0243958 A1 | 8/2016 | Miller et al. | |
| 2016/0311423 A1* | 10/2016 | Storm | B60L 50/40 |
| 2017/0120762 A1 | 5/2017 | Kettel et al. | |
| 2018/0273021 A1 | 9/2018 | Morimoto et al. | |

(Continued)

OTHER PUBLICATIONS

Invitation to Pay Additional Fees and, Where Applicable, Protest Fee, for International Application No. PCT/US2023/023042, mailed Aug. 7, 2023.

*Primary Examiner* — Dalena Tran
(74) *Attorney, Agent, or Firm* — Umang Khanna

(57) ABSTRACT

An intelligent charge limit for high voltage battery charging provides increased e-motor regeneration and reduced application of the foundation brake system of an electric vehicle. A plurality of data factors are used to calculate a maximum charge percentage. The maximum charge percentage is used to ensure there is enough charging capacity in a battery to store electrical current generated by an e-motor during downhill travel. The intelligent charge limit also provides an operator of the electric vehicle, the option of changing the charge limit to ensure that the battery receives the maximum electrical current generated by an e-motor, during downhill travel. The operator may also double plug a charging gun to eliminate a state of charge routine from considering offsetting the operator charging percentage by the plurality of data factors.

12 Claims, 3 Drawing Sheets

Down Hills will provide an opportunity to recuperate energy with regen

(56) References Cited

U.S. PATENT DOCUMENTS

| | | | |
|---|---|---|---|
| 2020/0062126 A1* | 2/2020 | Duan | B60L 58/25 |
| 2021/0061120 A1 | 3/2021 | Park et al. | |
| 2021/0380010 A1 | 12/2021 | Ando | |
| 2023/0303052 A1* | 9/2023 | Gesang | B60W 20/12 |
| 2023/0304809 A1* | 9/2023 | Schini | G01C 21/3492 |

* cited by examiner

INTELLIGENT CHARGE LIMIT FOR HIGH VOLTAGE BATTERIES

FIELD OF THE INVENTION

The present invention pertains to limiting the charge from an external charging source to a high voltage battery of a vehicle.

RELATED ART

Charging capacity of high voltage batteries is limited to about 90%-98% of a State of Charge (SOC), which is a calibration set by an OEM. When the state of charge of the battery is full, regeneration from an e-motor cannot function, because the electrical current generated by the e-motor cannot be stored in the high voltage battery, unless there is a mechanism on the vehicle to absorb it. Consequently, electrical current generated by the e-motor during downhill travel is wasted, because it cannot be stored in the battery. Thus, regeneration brake force from the e-motor cannot be used to slow down the vehicle. Further, if there is no heat dissipation resistor hardware component to waste energy at the e-motor, the electrical current cannot be stored in the battery and regeneration braking cannot occur. In this case, the foundation brakes can only be used to slow down the vehicle. E-motor regeneration normally decreases application of the foundation brakes.

Accordingly, there is a clearly felt need in the art for intelligently limiting charge of a high voltage battery, which allows the charge limit to be modified according to the terrain traveled by a vehicle; provide increased e-motor regeneration and reduce the number of applications of a foundation brake system; reduced risk of regeneration braking cut-out, reduced time and operating expenses for charging from an external source and a vehicle operator to change a maximum state of charge percentage.

SUMMARY

The present disclosure is an intelligent charge limit for high voltage battery charging, which provides increased e-motor regeneration and reduced application of the foundation brake system, reduced risk of regeneration braking cut-out and reduced time and operating expenses for charging from an external source. The intelligent charge limit also provides an operator of an electric vehicle powered by high voltage batteries and/or fuel cell systems the option of changing a charge limit to ensure that the battery receives the maximum amount of electrical current generated by an e-motor, during downhill travel. Less reliance on the foundation brake will prevent overheating of the foundation brake system during a long downhill road segment in the summertime. The intelligent charge limit will also prevent regeneration cutout, when the battery has no more room to receive electrical current from the e-motor during downhill travel. Less time will be spent at the charging station as a result of decreasing the maximum charge limit of the battery. The intelligent charge limit is applied to heavy and medium duty vehicles including school busses. The intelligent charge limit will not allow a charger gun to charge the battery greater than a preset maximum charger percentage as determined by a charge routine and/or an operator of the vehicle for anticipated downhill segments in a travel route. The intelligent charge limit includes the benefits of reduced risk of regeneration cutout; less time spent at a charging station; maximum use of regenerative braking; fewer applications of the foundation brakes and reduced operating expenses for charging the battery; and allowing an operator to change the maximum charge percentage.

DETAILED DESCRIPTION

Figure 1:
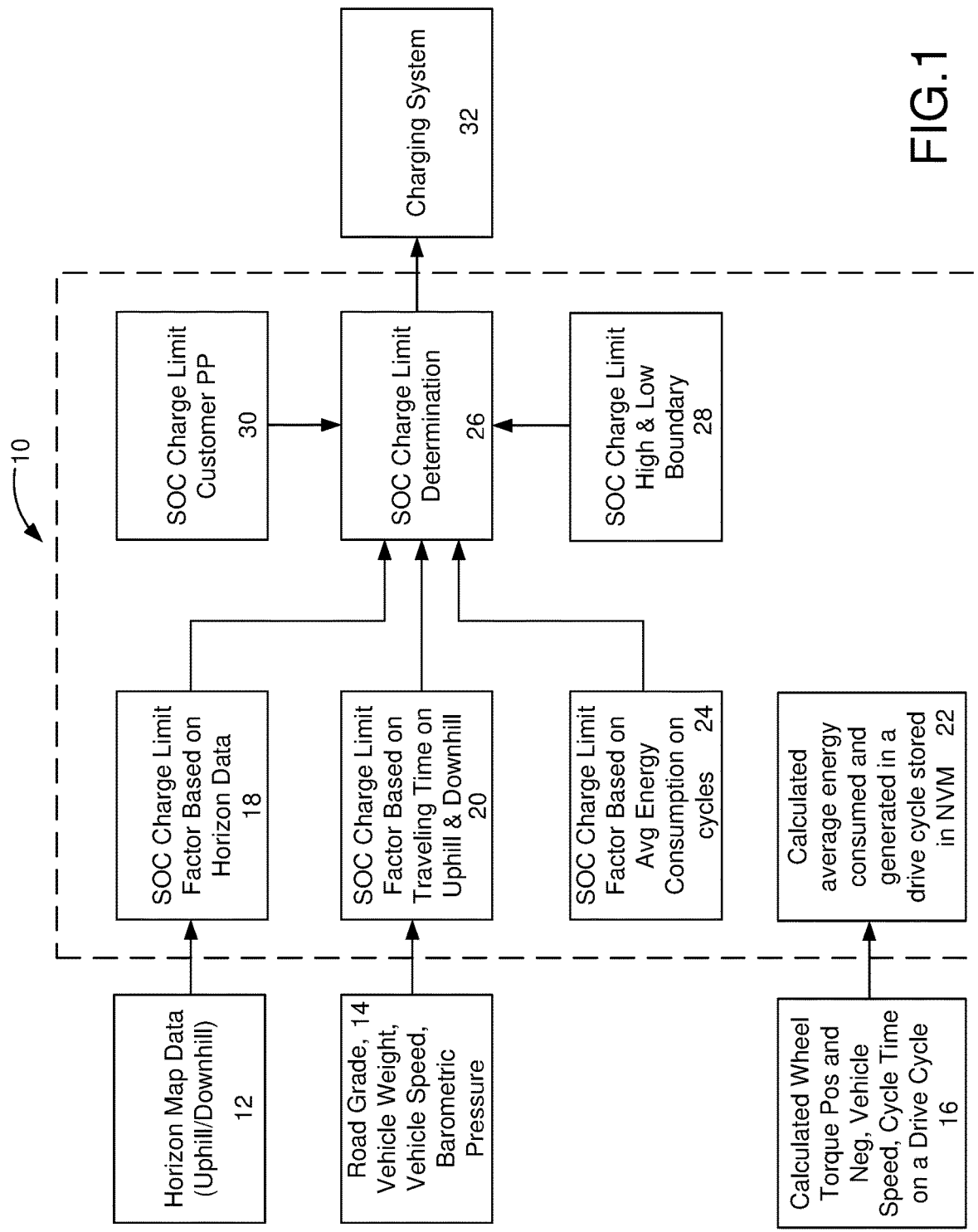
FIG. 1 is a flow chart of intelligent charge limit for a high voltage battery in accordance with the present invention.
Figure 2:
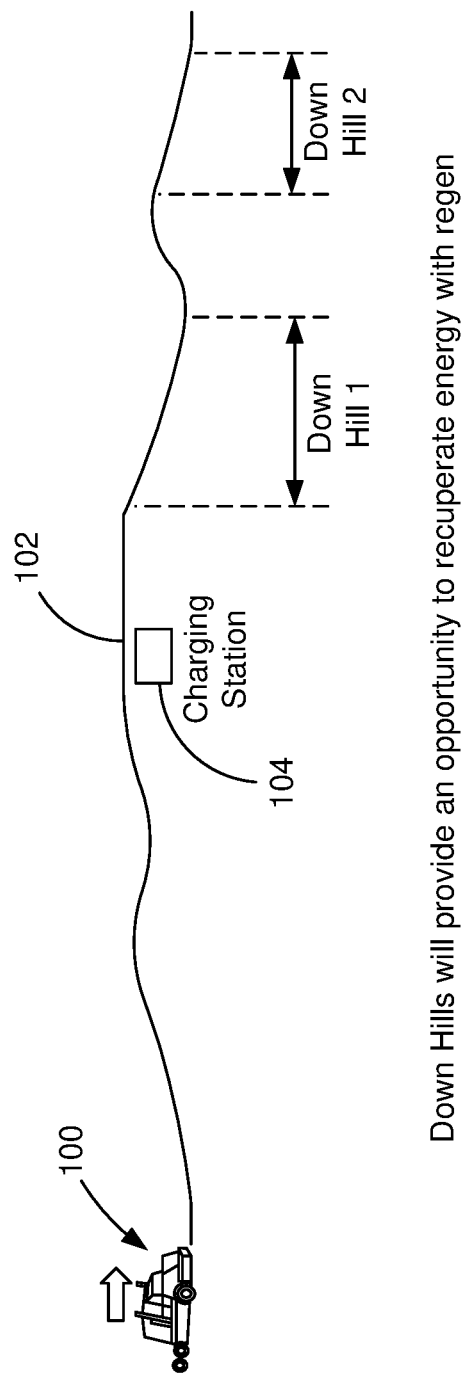
FIG. 2 is an illustration of a vehicle about to travel a route with multiple downhill segments.

With reference now to the drawings, and particularly to FIG. 1, there is shown an intelligent charge limit flow chart 10. An intelligent charge limit algorithm 5 receives data inputs from a horizon map 12; a road grade sensor 14; and wheel torque and vehicle speed 16. Horizon map data from the horizon map 12 will show if there is a future downhill road segment. Based on the data inputs from the horizon map 12, the road grade sensor 14 and the wheel torque and vehicle speed 16, the intelligent charge limit algorithm 5 will determine if and the amount that the maximum charge limit should be reduced and thus adjust the maximum charge limit accordingly. The road grade sensor 14 provides a slope of the terrain either positive or negative. With reference to FIG. 2, accumulated travelling distance based on information from the road grade sensor 14 will indicate whether the vehicle 100 is traveling on a relatively flat road surface or not. A flat travel route will be determined by monitoring information from the road grade sensor 14, vehicle speed, and using an up/down counter. The flat travel route will not result in any adjustment to the state of charge limit.

Figure 3:
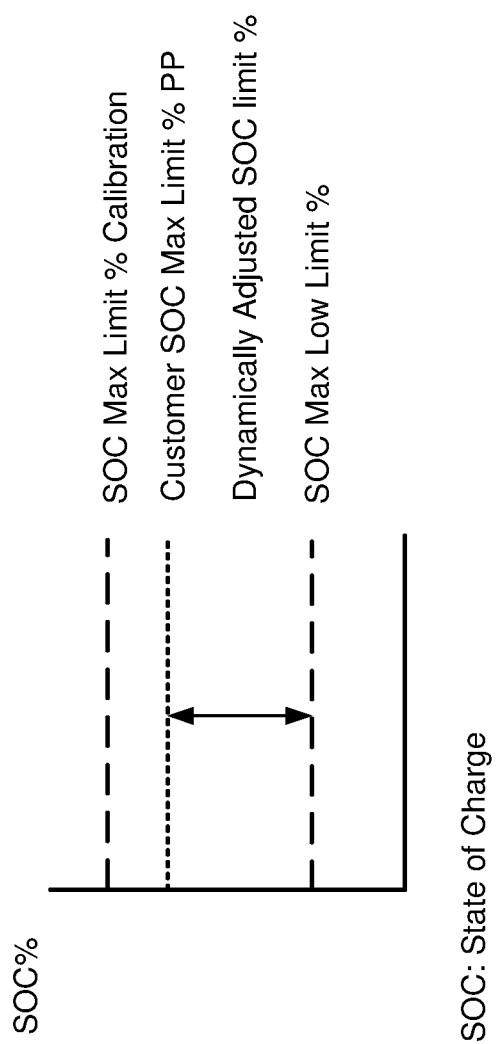
FIG. 3 is an illustration of upper and lower charge boundaries of an intelligent charge limit for a high voltage battery in accordance with the present invention.

Wheel torque and vehicle speed 16 are used to calculate an average percentage of energy consumption and generation with regeneration for a duty cycle based on multiple trips for highway and city cycles, utilizing a list of parameters stored in ECU, NVM or cloud to calculate the state of charge limit offset. A map state of charge limit factor 18 is calculated based on horizon data provided by the horizon map 12. A grade state of charge limit factor 20 is calculated based on data provided by the road grade sensor 14. A value of calculated average energy consumed and generated 22 is generated from the wheel torque and vehicle speed 16. A wheel state of charge limit factor 24 is calculated based on average energy consumed and generated 22. With reference to FIG. 3, a state of charge routine 26 receives input from the map state of charge limit factor 18, the grade state of charge limit factor 20 and the wheel state of charge limit factor 24.

The map state of charge limit factor 18, the grade state of charge limit factor 20 and the wheel state of charge limit factor 24 are all dynamic offset factors, which will change depending upon the travel route 102. Further, the map state of charge limit factor 18, the grade state of charge limit factor 20 and the wheel state of charge limit factor 24 are all dependent upon the loading of the vehicle. An e-motor of a lightly loaded vehicle will produce less electrical current output during downhill travel than a more heavily loaded vehicle. Consequently, a smaller charge limit reduction would be appropriate. With reference to FIG. 3, the state of charge routine 26 is also provided with preset upper and lower state of charge limit boundaries 28. It is preferable to have a maximum high limit state of charge percentage and a minimum low limit state of charge percentage. The maximum charge limit provides charging capacity in the high voltage battery to receive electrical charge from regenerative braking. The minimum charge limit prevents the customer from setting the state of charge limit percentage to low with a customer programmable parameter 30.

With reference to FIG. 3, the state of charge limit routine 26 receives input from the vehicle operator through customer programmable parameter 30. The vehicle operator is allowed to introduce a maximum charge limit based on their fixed vehicle operation route. The maximum charge limit is preferably entered through a customer programmable parameter or some type of human machine interface (HMI), which could be password protected. A fleet manager can determine which drivers get access to the password. The minimum lower limit is protected by the OEM to prevent a setting, which is too low. If the customer operates on a relatively flat travel route, such as Illinois or Indiana, the maximum charge limit can be programmed closer to the maximum charge boundary, such as 95%. However, if a customer operates in a mountain terrain area, the state of charge limit percentage can be programmed to a lower value, such as 80%, which will leave some room to charge the high voltage battery with regenerative braking while travelling downhill. The 80% value will also ensure most of the braking will derive from regeneration and not the foundation brake system. In addition, time spent at the charging station will be less, since the customer does not need to wait until the high voltage battery is charged to a percentage value in the high 90s. Approaching the maximum charge limit of the high voltage battery takes longer than a lower percentage limit. Thus, charging the high voltage battery to a lower limit will result in the customer spending less time at the charging station 104.

In order to provide flexibility and convenience to customers, the customer programmable parameter 30 will allow customers to override the dynamic offset factors during charging at the charging station 104. Once charging is successfully completed to the customer programmable parameter 30, operator needs to unplug a charger gun and plug it back to override the dynamic offset factors 18, 20, 24. The operator can ensure that the customer programmable parameter 30 overrides the dynamic offset factors 18, 20, 24 generated from the horizon map 12; the road grade sensor 14; and the wheel torque and vehicle speed 16. The state of charge routine 26 receives input from the map state of charge limit factor 18, the grade state of charge limit factor 20 and the wheel state of charge limit factor 24, the preset upper and lower state of charge limit boundaries 28 and the customer programmable parameter 30 and outputs a dynamically adjusting state of charge limit percentage. The state of charge routine 26 outputs a final maximum charge limit to a charging system 32.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. A method of providing an intelligent charge limit for a battery in a vehicle, comprising the steps of:
    utilizing at least one of horizon map data, a road grade sensor, wheel torque and vehicle speed, said horizon map data includes data of downhill segments in a travel route, said road grade sensor provides a slope of the travel route either positive or negative;
    calculating dynamically a percentage of a maximum charge limit to create a dynamic maximum charge limit for a battery based on at least one of said horizon map data, said road grade sensor, wheel torque and vehicle speed;
    inputting an operator maximum charge limit entered by a user;
    offsetting said operator maximum charge limit with said dynamic maximum charge limit to define a maximum charge limit for charging the battery.

2. The method of providing an intelligent charge limit of claim 1, further comprising the step of:
    providing a minimum low boundary percentage charge limit and a high maximum boundary percentage charge limit as a reference.

3. The method of providing an intelligent charge limit of claim 2, further comprising the step of:
    using said high maximum boundary percentage charge limit and minimum low boundary percentage charge limit for calculating said maximum charge limit.

4. The method of providing an intelligent charge limit of claim 3, further comprising the step of:
    entering said high maximum boundary percentage charge limit and minimum low boundary percentage charge limit with one of a customer programmable parameter or an HMI device.

5. The method of providing an intelligent charge limit of claim 1, further comprising the step of:
    inputting data based on previous trips on the same travel route to calculate said maximum charge limit.

6. The method of providing an intelligent charge limit of claim 1, further comprising the step of:
    utilizing a weight of a vehicle to determine a charge limit percentage.

7. The method of providing an intelligent charge limit of claim 6, further comprising the step of:
    inputting data based on previous trips on the same travel route.

8. The method of providing an intelligent charge limit of claim 7, further comprising the step of:
    providing a minimum low boundary percentage charge limit and a high maximum boundary percentage charge limit as a reference.

9. The method of providing an intelligent charge limit of claim 8, further comprising the step of:
    using said high maximum boundary percentage charge limit and minimum low boundary percentage charge limit for calculating said maximum charge limit.

10. The method of providing an intelligent charge limit of claim 9, further comprising the step of:
    entering said high maximum boundary percentage charge limit and minimum low boundary percentage charge limit with one of a customer programmable parameter or an HMI device.

11. A method of providing an intelligent charge limit for a battery in a vehicle, comprising the steps of:
    utilizing at least one of horizon map data, a road grade sensor, wheel torque and vehicle speed, said horizon map data includes data of downhill segments in a travel route, said road grade sensor provides a slope of the travel route either positive or negative;
    calculating dynamically a percentage of a maximum charge limit to create a dynamic maximum charge limit for a battery based on at least one of said horizon map data, said road grade sensor, wheel torque and vehicle speed;

inputting an operator maximum charge limit entered by a user;

re-plugging a charge gun at a charge station to eliminate said dynamic maximum charge limit from being used in calculating a maximum charge limit for charging the battery.

12. The method of providing an intelligent charge limit of claim 11, further comprising the step of:

utilizing a weight of a vehicle to determine a charge limit percentage.

\* \* \* \* \*